(12) United States Patent
Trakic et al.

(10) Patent No.: US 7,225,295 B2
(45) Date of Patent: May 29, 2007

(54) EXTERNAL RAM MODULE

(75) Inventors: Adnan Trakic, North Potomac, MD (US); Amit Jnagal, New Delhi (IN); Pankaj Pathak, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 11/028,706

(22) Filed: Jan. 4, 2005

(65) Prior Publication Data
US 2006/0149887 A1    Jul. 6, 2006

(51) Int. Cl.
*G06F 13/00* (2006.01)
*G06F 3/00* (2006.01)
*G06F 12/00* (2006.01)

(52) U.S. Cl. ..................... 711/115; 711/104
(58) Field of Classification Search ............. 711/104, 711/2, 115
See application file for complete search history.

(56) References Cited

U.S. PATENT DOCUMENTS

| | | | | |
|---|---|---|---|---|
| 4,592,018 A | * | 5/1986 | Wiegman | 365/63 |
| 5,497,292 A | * | 3/1996 | Gandre | 361/818 |
| 5,524,232 A | * | 6/1996 | Hajeer | 711/115 |
| 5,572,701 A | * | 11/1996 | Ishida et al. | 711/146 |
| 5,606,672 A | * | 2/1997 | Wade | 710/316 |
| 5,611,075 A | * | 3/1997 | Garde | 711/153 |
| 5,921,816 A | | 7/1999 | Larabell | |
| 6,004,139 A | * | 12/1999 | Dramstad et al. | 439/59 |
| 6,182,159 B1 | * | 1/2001 | Urabe | 710/2 |
| 6,434,648 B1 | | 8/2002 | Assour et al. | |
| 6,895,470 B2 | * | 5/2005 | San et al. | 711/115 |
| 6,920,527 B2 | * | 7/2005 | Cloutier et al. | 711/115 |
| 7,047,361 B2 | * | 5/2006 | Chong et al. | 711/115 |
| 2001/0039603 A1 | * | 11/2001 | Manowitz | 711/115 |
| 2002/0010835 A1 | * | 1/2002 | Post et al. | 711/115 |
| 2002/0038405 A1 | * | 3/2002 | Leddige et al. | 711/115 |
| 2003/0056071 A1 | * | 3/2003 | Triece et al. | 711/165 |

FOREIGN PATENT DOCUMENTS

DE    10005518 A1    8/2001

* cited by examiner

*Primary Examiner*—Walter Griffin
*Assistant Examiner*—Thomas Horvath
(74) *Attorney, Agent, or Firm*—Douglas A. Lashmit; Hoffman, Warnick & D'Alessandro LLC

(57) ABSTRACT

An external random access memory (RAM) module for increasing the RAM capacity of a computer system. The RAM module includes: a plurality of RAM slots for receiving removable memory modules; a memory addressing unit for addressing the removable memory modules in the external RAM module; and a connector for connecting the memory addressing unit to an external port of the computer system, wherein the external port is addressable by a processing unit in the computer system.

13 Claims, 3 Drawing Sheets

EXTERNAL RAM MODULE

BACKGROUND OF THE INVENTION

1. Technical Field

The present invention relates generally to systems for expanding random access memory (RAM) capabilities on a computer system, and more specifically relates to a portable RAM module that can be externally connected to a computer system to provide increased RAM capabilities.

2. Related Art

As the use of personal computers (i.e., desktops, laptops, workstations, PDA's, etc.) continues to flourish, the capabilities and deliverable expectations of software applications also continues to dramatically increase. In line with these increased capabilities, the hardware resources required to run these applications have also dramatically increased. Not long ago, 32 Megabytes (MB) of RAM would suffice for most processing needs. Over time, 64 MB, then 128 MB, then 256 MB, all came and went as sufficient processing configurations, and these days even 512 MB often does not suffice.

For an organization that uses thousands of desktops, the management of hardware upgrades is far more expensive and time consuming than associated software upgrades. The process of upgrading hardware can often have a huge impact on employee productivity—a developer could lose the whole morning while waiting for an upgrade to take place. Typically, these organizations have a "standard configuration" defined for a time period, which they try to upgrade with time, e.g., a standard configuration may comprise 256 MB of memory and a PENTIUM™ 3 processor. This standard configuration is reviewed and updated on a year to year basis.

More often than not, additional memory requirements are intermittent. That is, a user may require additional memory to carry out a part of his job for some period of time. For example, for a group of machines being used for application development and support, the processing power requirement spikes during the time of an application release, which could be three or four months of year. On other occasions, e.g., when a user needs to edit large files, such as a several gigabyte (GB) video file, or even huge worksheets, the user may need more memory. However, this requirement is often short-lived as the additional memory may not be required after the specific operation.

A common approach to handle this issue is to purchase and install additional RAM. Unfortunately, upgrading RAM is a relatively costly process as the memory upgrade process requires the computer chassis to be opened and the RAM module installed in each of the machines. This activity requires a level of hardware knowledge and cannot be carried out by a typical end user. Moreover, if the user has more than one machine that has intermittent RAM requirements from time to time, then all the machines will have to be upgraded, as there is no technology in place to share memory.

Another approach could be that the user procures RAM for one machine and then manually removes it and plugs it on other machines as required. As pointed out earlier, this requires a level of expertise and the RAM slots are likely to be damaged if the RAM is frequently removed and installed.

Furthermore, the price of the upgrade may be dictated by the number of free RAM slots in the machine. If the machine has only two RAM slots available, and it already has two memory modules of 128 MB each installed, then the user would need to buy a fresh 512 MB memory module or two memory modules of 256 MB each to upgrade to 512 MB. Even though the upgrade is from 256 MB to 512 MB, the user would end up paying for the entire 512 MBs.

At first look, "grid computing" seems to be a likely solution that could address the problem in future. A grid creates a virtual super computer out of existing workstations by knitting them together. This super computer can be used to host business applications at lightening speeds. A grid application can offload a quantum of its work to any other node that has free resources available. These new breed of applications are capable of harnessing the processing power of other free machines "On Demand."

Unfortunately, grid computing addresses a different, although very important, aspect of the problem. The applications that are supposed to run on the grid need to be specially written and deployed for that purpose. If an end user needs additional memory for editing a large video file, the user cannot use the grid unless that video editing software is grid enabled. Moreover, even if the application is grid enabled, the user would need to link with a grid provider and have that application deployed on the grid.

There is currently no technology that enables different workstations or laptops to share memory. There are some new technologies that would let applications share the processing power of other machines on the network, but the problem of additional memory requirements would continue to exist in the near future. Accordingly, a need exists for a cost effective solution for intermittently upgrading RAM on personal computers.

SUMMARY OF THE INVENTION

The present invention addresses the above-mentioned problems, as well as others, by providing an external RAM module that is connectable to an external port of a computer system. In a first aspect, the invention provides an external random access memory (RAM) module for increasing the RAM capacity of a computer system, comprising: a plurality of RAM slots for receiving removable memory modules; a memory addressing unit for addressing the removable memory modules in the external RAM module; and a connector for connecting the memory addressing unit to an external port of the computer system, wherein the external port is addressable by a processing unit in the computer system.

In a second aspect, the invention provides a computer having a system for providing external random access memory (RAM) expansion, comprising: a chassis; a motherboard that resides within the chassis and includes a processor, a memory addressing unit, and a plurality of RAM slots for receiving removable memory modules; an external port residing on an external portion of the chassis, wherein the external port is addressable from the processor; and an external RAM module that is externally connectable to the external port to provide RAM for the computer.

In a third aspect, the invention provides an adaptor installable in a computer system that allows an external random access memory (RAM) module to be externally connected to the computer system, comprising: an adaptor card that can be plugged into a RAM slot on the motherboard of the computer system; and a cable that connects the adaptor card to an external port on the computer system, wherein the external port is adapted to be coupled to the external RAM module.

In a fourth aspect, the invention provides a computer having a system for providing external random access memory (RAM) expansion, comprising: a chassis; a motherboard that resides within the chassis and includes a processor, a memory addressing unit, and a plurality of RAM slots for receiving removable memory modules; and an external port residing on an external portion of the chassis, wherein the external port is coupled to, and directly addressable from, the memory addressing unit.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
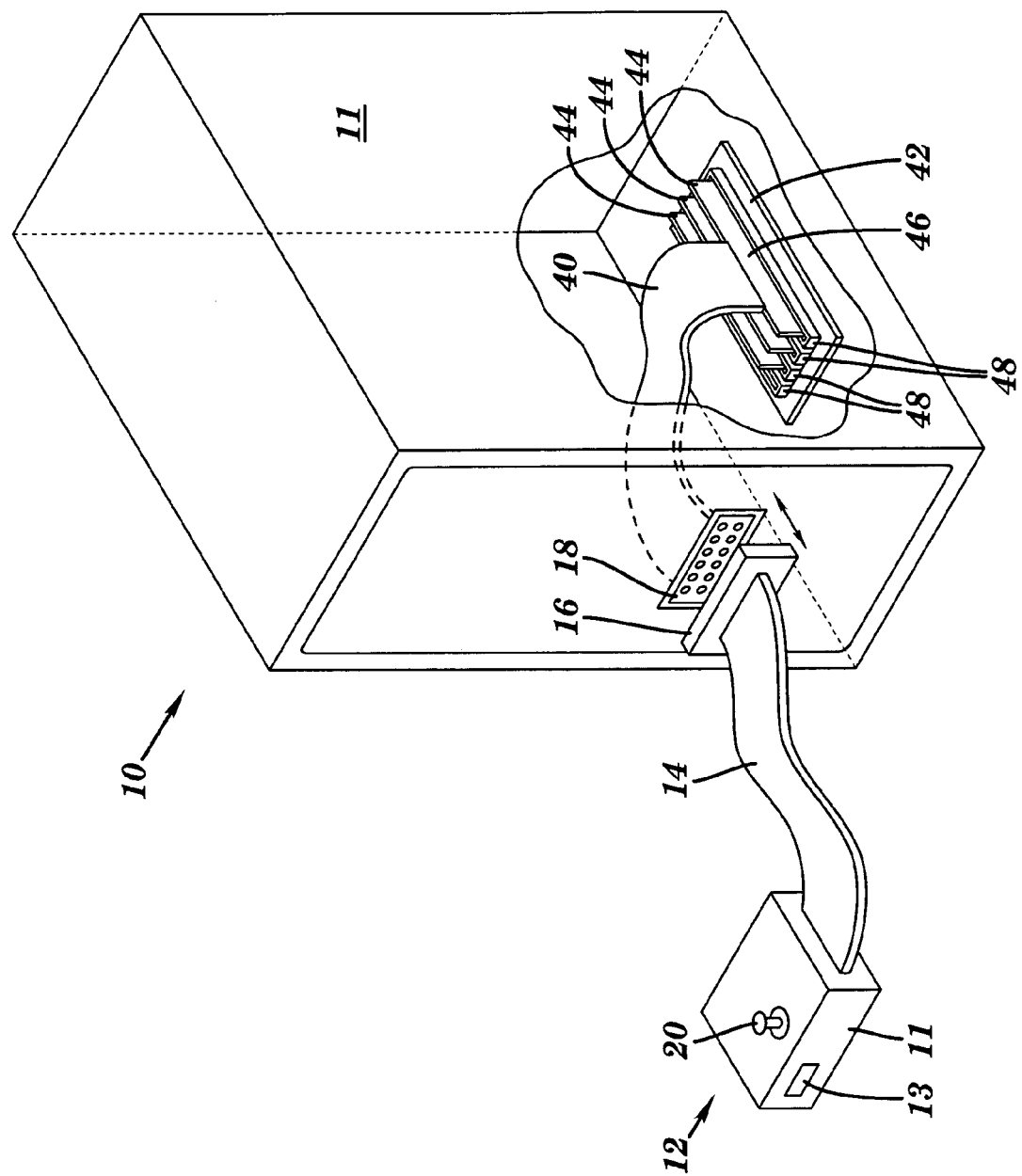
FIG. 1 depicts a computer system and external RAM module in accordance with the present invention.
Figure 3:
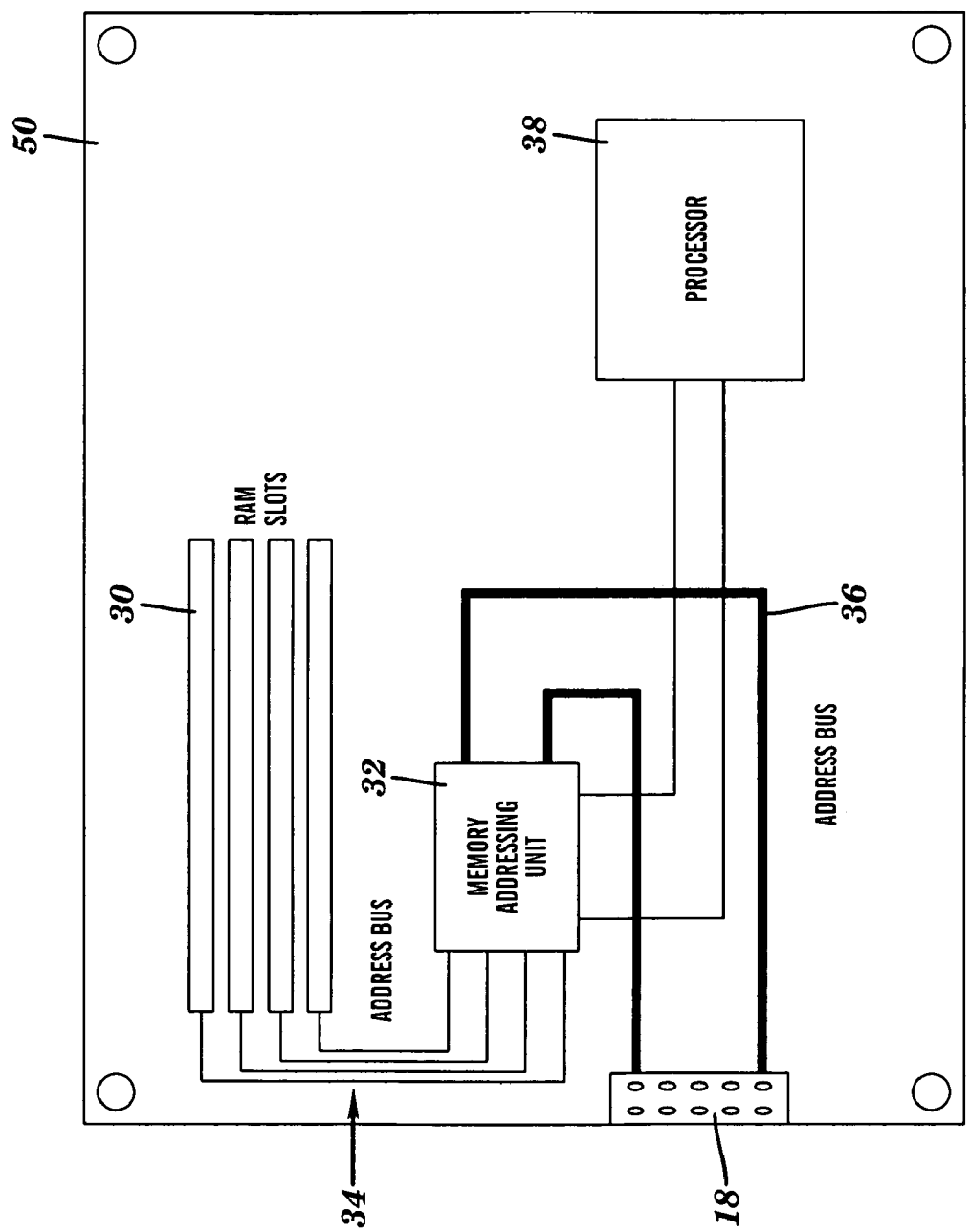
FIG. 3 depicts a motherboard for supporting an external RAM module in accordance with the present invention.

Referring now to the drawings, FIG. 1 depicts a computer system 10 having an external RAM module 12 to provide on demand RAM capabilities for computer system 10. To allow for the addition of the external RAM module 12, computer system 10 is equipped with an external port 18 mounted on an external surface of the computer chassis 11. As described in further detail below, external port 18 is coupled to the motherboard 42 of computer system 10 either via an adaptor card 46 that plugs into an existing RAM slot (as shown in FIG. 1), or via dedicated hardware (as shown in FIG. 3). External RAM module 12 can be plugged into or removed from the computer system 10 in the same manner as other external devices, e.g., a mouse, keyboard, etc.

Computer system 10 includes hardware components typical of those found in a personal computer. One such component of relevance to the present invention is motherboard 42, which generally includes a processor coupled to a memory addressing unit that allows the processor to address RAM. In the configuration shown in FIG. 1, which is typical for most current personal computers, RAM is packaged on removable memory modules 44 that can be plugged into RAM slots 48 on the motherboard 42. These slots 48 are connected to the processor of the computer through motherboard circuitry. The processor addresses a particular memory location using an address bus, which uniquely identifies the memory location. Each RAM memory module 44 in turn has a memory address decoder unit embedded in it. This maps the address bus to the installed memory chips. The memory addressing decoder is responsible for addressing all the memory addresses on the RAM module. Each processor has a maximum limit of memory addresses that it can address. For example, a Pentium 4 processor has 1 GB, so it can only handle memory addressed up to 1 GB.

To implement external port 18, an adaptor card 46 is plugged into an empty RAM slot 48 in place of a RAM memory module 44. The adaptor card 46 includes a cable 40 that couples the adaptor card 46 to external port 18. Adaptor card 46 is configured to "extend" the RAM slot in which it is inserted to the external RAM module 12. Thus, external RAM module 12 appears to the motherboards' memory addressing unit as just another bank of RAM that can be addressed. When the external RAM module 12 is not plugged in, no memory is recognized by the motherboard's memory addressing unit. In this way, external port 18 essentially provides the functionality of a RAM slot 48 on the motherboard 42.

External RAM module 12 generally includes: a connector 16 that can be mechanically and electrically coupled to external port 18; a container 11 for physically holding RAM and other related hardware; and a cable 14 that couples the connector 16 to the container 11. A container access system 20 (e.g., a door or panel) allows the container 11 to be opened in order to access and modify the RAM stored therein. Thus, as described in further detail below, the processor on the computer system 10 can address RAM in the external RAM module 12 as though the RAM physically resided in a RAM slot 48 on the motherboard 42. External RAM module 12 may also include one or more indicators 13 that detail operational characteristics, e.g., amount and type of RAM in the container 11, RAM faults, etc., for instance using IBM's autonomic enablement system.

It should be understood that the overall configuration of the computer system 10 and external RAM module 12 described in FIG. 1 is not meant to be limiting. For instance, it should be understood that computer system 10 may comprise any type of computer system that utilizes RAM, e.g., a laptop, personal digital assistant (PDA), workstation, server, smart appliance, etc. Moreover, the overall configuration of the components on motherboard 48 in computer system 10 need not reside on a single physical board, but instead could be distributed throughout the computer system 10. Furthermore, external RAM module 12 could be packaged in any manner so long as it is operationally connectable to the external port 18.

Figure 2:
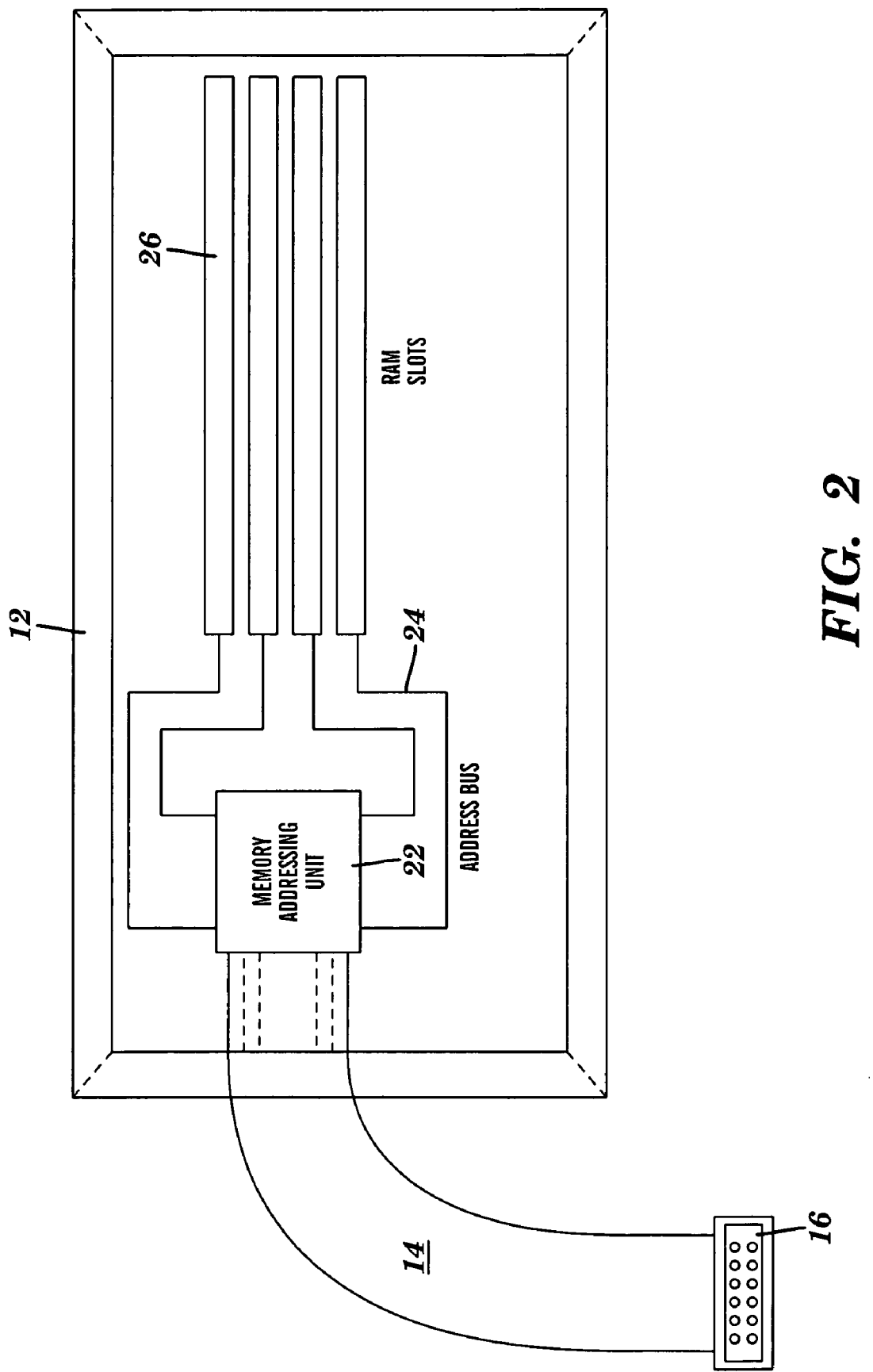
FIG. 2 depicts a general diagram of an external RAM module in accordance with the present invention.

Referring now to FIG. 2, a schematic diagram of external RAM module 12 is shown including connector 16 that is coupled to memory addressing unit 22 via cable 14. Memory addressing unit 22 is in turn coupled to one or more external RAM slots 26 via an address bus 24. Each external RAM slot 26 is configured for receiving a memory module in the same manner as motherboard 42 of computer system 10 shown in FIG. 1. In the case where multiple RAM slots are used, memory addressing unit 22 decodes the signals received from the motherboard 42 on computer system 10 to determine which memory module should be accessed. The memory addressing unit 22 in the external RAM module 12 receives signals from the processor in the same manner as the memory address unit on the computer system's motherboard. The memory addressing unit 22 then addresses the installed memory in its external RAM slots 26. Thus, RAM contained in the external RAM module 12 can be addressed from the processor as though it resided on the motherboard 42.

Referring now to FIG. 3, an alternate embodiment of a motherboard 50 for computer system 10 is shown. In this embodiment, rather than using an adaptor card 46 that plugs into one of the RAM slots 30 inside computer system 10 (as shown in FIG. 1), a dedicated address bus 36 from the memory addressing unit 32 to the external port 18 is provided on the motherboard 50. Thus, processor 38, using memory addressing unit 32, can either access RAM slots 30 via address bus 34 or access external port 18 via address bus 36. This embodiment would therefore provide built-in external RAM access without the use of an adaptor card 46.

It should be noted that any materials may be utilized to implement the invention. However, similar materials, e.g., copper wire of a particular gauge, may be utilized in the adaptor card 26, cabling 14, 40, connector 16, external port 18, etc., as which is used on the computer system motherboard 42 to avoid performance issues.

As is evident, the invention addresses the need for temporarily increasing the processing power of a machine without a long-term investment in new RAM. Moreover, external RAM modules can be shared by multiple users simply by unplugging it from one machine and plugging it into another, thereby reducing the cost of upgrading all the machines for intermittent requirements. Furthermore, users need not open their computer system chassis to address RAM issues. The solution also serves as a means to increase the number of RAM slots available in a machine. For existing machines, a single RAM slot can be extrapolated to four or more slots in the external RAM module 12. In addition, external RAM module 12 can be utilized with laptops in which RAM is typically more expensive than that for workstations. The use of the invention is also safer as the machine is not physically opened for the RAM upgrade and the RAM slots are less likely to be damaged.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. An external random access memory (RAM) module for increasing the RAM capacity of a computer system, comprising:
    a plurality of RAM slots for receiving removable memory modules;
    a memory addressing unit for addressing the removable memory modules in the external RAM module;
    a connector for connecting the memory addressing unit to an external port of the computer system, wherein the external port is addressable by a processing unit in the computer system; and
    an adapter for coupling the external port to an internal RAM slot within a chassis containing the computer system.

2. The external RAM module of claim 1, wherein the connector mechanically and electrically couples the external RAM module to the external port.

3. The external RAM module of claim 1, further comprising a removable cover for accessing the plurality of RAM slots.

4. The external RAM module of claim 1, further comprising a display for displaying operational characteristics of the removable memory modules.

5. An external random access memory (RAM) module for increasing the RAM capacity of a computer system comprising:
    a plurality of RAM slots for receivinci removable memory modules;
    a memory addressing unit for addressing the removable memory modules in the external RAM module; and
    a connector for connecting the memory addressing unit to an external port of the computer system;
    wherein the external port is directly addressable by a memory addressing unit on a motherboard of the computer system via a first, dedicated address bus, and wherein a removable memory module in a RAM slot on the motherboard is addressable by the memory addressing unit via a second address bus.

6. A computer having a system for providing external random access memory (RAM) expansion, comprising:
    a chassis;
    a motherboard that resides within the chassis and includes a processor, a memory addressing unit, and a plurality of RAM slots for receiving removable memory modules;
    an external port residing on an external portion of the chassis, wherein the external port is addressable from the processor; and
    an external RAM module that is externally connectable to the external port to provide RAM for the computer, wherein the external port is coupled to an adaptor that plugs into one of the RAM slots on the motherboard.

7. The computer of claim 6, wherein the external port is coupled to the memory addressing unit on the motherboard.

8. The computer of claim 6, wherein the external RAM module comprises:
    a second plurality of RAM slots for receiving removable memory modules;
    a second memory addressing unit for addressing the removable memory modules in the external RAM module; and
    a connector for connecting the second memory addressing unit to the external port.

9. The computer of claim 8, wherein the external RAM module further comprises a removable cover for accessing the second plurality of RAM slots.

10. The computer of claim 8, wherein the external RAM module further comprises a display for displaying operational characteristics of the removable memory modules.

11. An adaptor installable in a computer system that allows an external random access memory (RAM) module to be externally connected to the computer system, comprising:
    an adaptor card that can be plugged into a RAM slot on the motherboard of the computer system; and
    a cable that connects the adaptor card to an external port on the computer system, wherein the external port is adapted to be coupled the external RAM module.

12. A computer having a system for providing external random access memory (RAM) expansion, comprising:
    a chassis;
    a motherboard that resides within the chassis and includes a processor, a memory addressing unit, and a plurality of RAM slots for receiving removable memory modules; and
    an external port residing on an external portion of the chassis, wherein the external port is coupled to, and directly addressable from, the memory addressing unit via a first, dedicated address bus, and wherein a removable memory module in a RAM slot on the motherboard is addressable by the memory addressing unit via a second address bus.

13. An adaptor for connecting an external random access memory (RAM) module to an external port of a computer system, comprising:
    an adaptor card pluggable into an internal RAM slot on a motherboard of the computer system; and
    a cable for connecting the adaptor card to the external port on the computer system.

* * * * *